(12) United States Patent
Greiner

(10) Patent No.: US 6,964,497 B2
(45) Date of Patent: *Nov. 15, 2005

(54) LIGHTING DEVICE WITH POINT-SHAPED LIGHT SOURCES

(75) Inventor: Horst Greiner, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 150 days.

This patent is subject to a terminal disclaimer.

(21) Appl. No.: 10/050,260

(22) Filed: Jan. 16, 2002

(65) Prior Publication Data

US 2002/0097578 A1 Jul. 25, 2002

(30) Foreign Application Priority Data

Jan. 20, 2001 (DE) .......................... 101 02 586

(51) Int. Cl.[7] .................... F21V 7/04; F21V 8/00
(52) U.S. Cl. .................. 362/241; 362/30; 362/247; 362/297; 362/307; 362/555; 362/560
(58) Field of Search ................. 362/26–31, 240, 362/241, 245, 247, 248, 297, 307, 311, 555, 560, 561

(56) References Cited

U.S. PATENT DOCUMENTS

| | | | | |
|---|---|---|---|---|
| 2,953,668 A | * | 9/1960 | Bassett, Jr. ........... | 200/313 |
| 3,131,670 A | * | 5/1964 | Hardesty ............. | 116/288 |
| 3,241,256 A | * | 3/1966 | Viret et al. ........... | 40/546 |
| 4,096,550 A | * | 6/1978 | Boller et al. ......... | 362/31 |
| 4,449,024 A | * | 5/1984 | Stracener ............. | 200/317 |
| 4,714,983 A | * | 12/1987 | Lang .................... | 362/27 |
| 4,991,064 A | * | 2/1991 | Clem ................... | 362/27 |
| 5,115,379 A | * | 5/1992 | Nagai ................... | 362/23 |
| 5,249,104 A | * | 9/1993 | Mizobe ................ | 362/31 |
| 5,397,867 A | * | 3/1995 | Demeo ................. | 200/314 |
| 5,537,300 A | * | 7/1996 | Kraines et al. ...... | 362/31 |
| 5,711,588 A | * | 1/1998 | Rudisill ............... | 362/30 |
| 6,404,131 B1 | * | 6/2002 | Kawano et al. ..... | 362/245 |
| 6,561,663 B2 | * | 5/2003 | Adachi et al. ...... | 362/31 |

* cited by examiner

Primary Examiner—Alan Cariaso

(57) ABSTRACT

A lighting device is described which comprises a light emission surface (11) and a plurality of substantially point-shaped light sources (21) such as, for example, LEDs, and which is suitable in particular for backlighting liquid crystal displays such as LCD picture screens, or for use as a planar light radiator. The lighting device is characterized in particular in that an optical waveguide plate (1) is provided with a plurality of cavities (20) for the light sources (21), which cavities are covered with a first reflecting layer (204) on their upper sides (203) facing the light emission surface (11), while the coupling of the light into the optical waveguide plate takes place through side walls (201) of the cavities. A very homogeneous distribution of the luminous intensity on the light emission surface is achieved thereby.

21 Claims, 1 Drawing Sheet

LIGHTING DEVICE WITH POINT-SHAPED LIGHT SOURCES

The invention relates to a lighting device which comprises a light emission surface and a plurality of substantially point-shaped light sources such as, for example, LEDs, and which is suitable in particular for backlighting of liquid crystal displays such as LCD picture screens, or for use as a planar light radiator.

It is generally known that LCD picture screens require a backlighting of their entire surface area which is as homogeneous as possible for rendering an image visible. The problem often arises, however, in particular in the case of large lighting devices, that a high luminous intensity cannot be generated with sufficient homogeneity on the entire light emission surface in front of which the picture screen is positioned. This may lead to unpleasant picture effects. Furthermore, these lighting devices should have as small as possible a constructional depth in many cases.

A lighting device is known, for example, from DE-297 07 964 in which a plurality of light-emitting diodes is arranged on a printed circuit board in a housing, the light emission surface thereof being provided with a diffusing disc. The printed circuit board is coated with a diffuse reflector. The object of this is to achieve a homogeneous, high luminous intensity on the light emission surface. A disadvantage of this so-termed direct backlighting is, however, that a comparatively great distance is to be maintained between the light-emitting diodes and the diffusing disc if a homogeneous light distribution is to be achieved. This requires a comparatively great constructional depth. A further disadvantage follows from the fact that the two light-scattering layers lead to losses, so that the efficiency of such backlighting systems (i.e. the proportion of the light generated by the light sources which is actually available at the light emission surface) amounts to at most approximately 50%.

It is an object of the invention, accordingly, to provide a lighting device of the kind mentioned in the opening paragraph which is particularly suitable for use as a backlighting unit for large LCD picture screens and which renders possible a homogeneous, intensive illumination of the picture screen in combination with a small constructional depth.

According to claim 1, this object is achieved by means of a lighting device which comprises a light emission surface and a plurality of substantially point-shaped light sources, and which is characterized by an optical waveguide plate into which a plurality of cavities is provided, each cavity accommodating a light source, which cavities each comprise an upper side facing the light emission surface and side walls, said upper side being covered with a first reflecting layer, while the coupling of the light into the optical waveguide plate takes place through the side walls.

An essential advantage of this solution is that the light of each individual light source is distributed substantially homogeneously over the entire optical waveguide plate, and yet cannot directly hit the light emission surface when coming from the light sources, so that there is no appreciable dependence of the emerging light on the individual properties of the light sources used such as, for example, fluctuations in luminous intensity. Nevertheless, a very high proportion of the quantity of light generated by each light source is available at the light emission surface owing to this kind of light coupling, so that the losses are low and the efficiency of the light sources is high, because no diffusing discs are required and the losses involved therewith do not occur.

A high luminous intensity with a homogeneous distribution is thus achieved, while it is possible to choose a desired intensity through a corresponding choice of a number of light sources. Finally, a very planar construction can also be realized.

The dependent claims relate to advantageous further embodiments of the invention.

A particularly high homogeneity of the light at the light emission surface is achieved with the embodiments as claimed in claims 2, and 9 to 11, because no portion of the light issued by the light sources can directly reach the light emission surface.

The efficiency of the light sources is further increased with the embodiments of claims 3, 7, and 8, while the embodiments of claims 4 and 5 are particularly simple to manufacture.

A very inexpensive lighting device of low weight can be manufactured with the choice of light sources as defined in claim 6. In addition, the brightness of the light at the light emission surface is adjustable in a simple manner through a corresponding adjustment of the supply voltage of the light sources.

Further particulars, features, and advantages of the invention will become apparent from the ensuing description of a preferred embodiment, which is given with reference to the drawing, in which.

Figure 1:
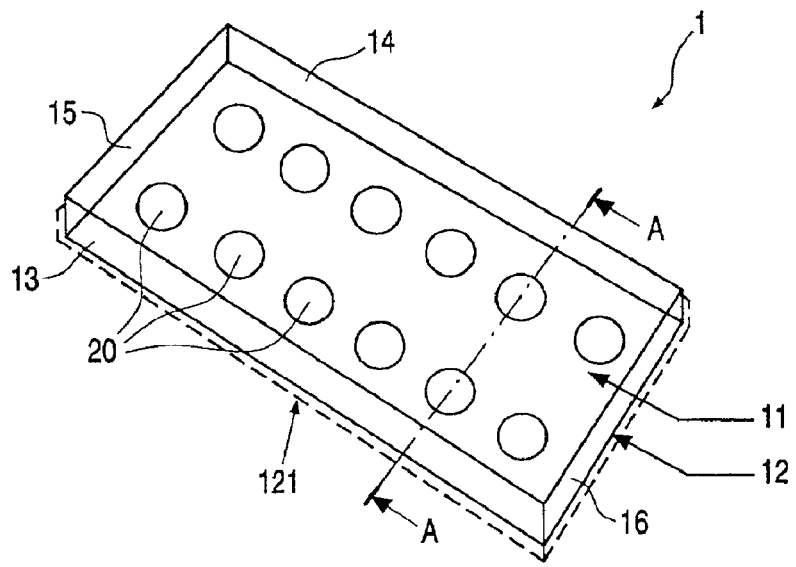
FIG. 1 is a perspective view of the preferred embodiment.

FIG. 1 shows a rectangular optical waveguide plate 1 which is manufactured from a material which is transparent to light. The plate comprises a light emission surface 11 at its upper side, from which the light is coupled out in a known manner, a lower side 12 opposite thereto, and two long side faces 13, 14 and two short side faces 15, 16. A plurality of cylindrical cavities 20 (indicated diagrammatically) for light sources is provided in the lower side of the plate 1, which cavities extend in the direction of the light emission surface 11.

The number and the mutual distances of the cylindrical cavities are immaterial and may be chosen in dependence on the size of the lighting device, the desired luminous intensity of the light emission surface, and the nature of the light sources. To achieve a homogeneous light distribution, the cavities are distributed as evenly as possible over the optical waveguide plate 1.

The optical waveguide plate 1, and in particular its light emission surface 11, need not necessarily be rectangular. Alternatively, other shapes such as, for example, quadratic, round, or oval shapes, etc., are possible. Cross-sections other than circular cross-sections of the cavities may be chosen, for example rectangular or polygonal.

Figure 2:
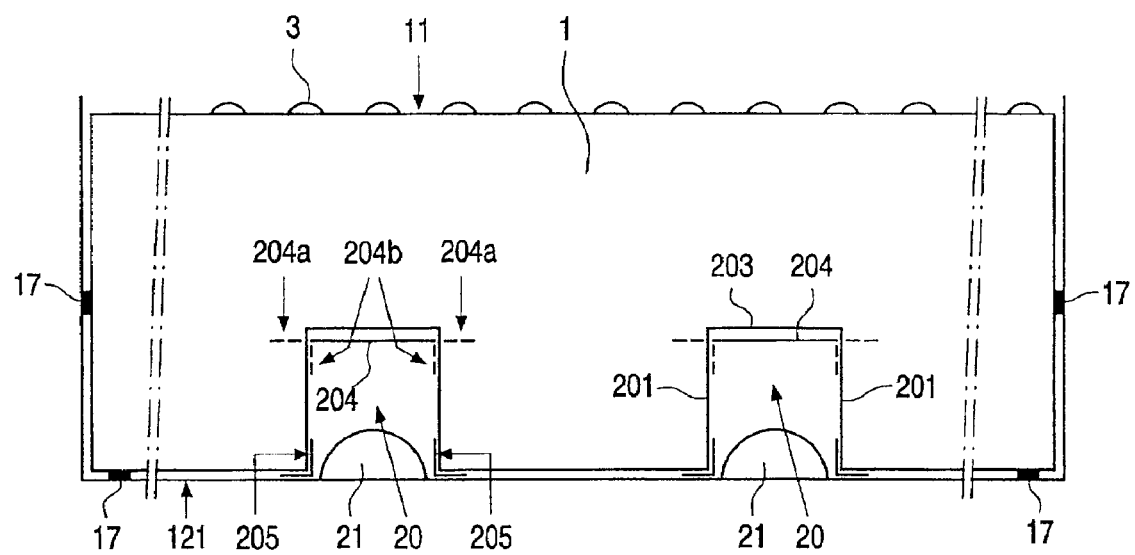
FIG. 2 is a cross-sectional view of the lighting device of FIG. 1.

FIG. 2 is a cross-sectional view of the optical waveguide plate 1 in the region of two cavities 20 taken on the line A—A in FIG. 1, each cavity having side walls 201 and an upper side 203. A substantially point-shaped light source 21 is present in each cavity, which light source may be, for example, a light-emitting diode. The side walls 201, which are substantially perpendicular to the light emission surface 11 of the optical waveguide plate 1, are formed by the material of the optical waveguide plate 1, whereas the upper sides 203, which are substantially parallel to the light emission surface 11, are provided with a first layer 204 which is highly reflecting on both sides.

There are two possibilities here. Either the first layer 204 is directly provided on the upper side 203 of the cavity 20, so that there is no gap or intermediate space between the optical waveguide plate 1 and the first layer 204. This results in an optical contact between this layer and the optical waveguide plate 1, in which case the layer must be as mirroring as possible. Alternatively, it is possible to provide the layer 204 at a distance from the upper side 203 of the cavity in the direction of the inner space thereof, such that a gap arises, while the layer may be, for example, slightly concavely curved in the direction of the light source. In this case there is no optical contact between the layer 204 and the optical waveguide plate 1, and the light from the plate 1 is reflected back by means of total reflection into the plate at the upper side 203 of the cavity already, or at the transition surface between the material of the optical waveguide plate and the gap. Since this reflection causes only very low losses, it is generally preferred to distance the first layer 204 from the upper side 203.

The lower side of each cavity 20, finally, is covered with a highly reflecting second layer 121. This layer may be provided, for example, on a bottom wall as well as, preferably, on the inner walls of a housing (not shown) surrounding the optical waveguide plate 1, so that the second reflecting layer 121 covers the entire lower side 12 and also the side faces 13 to 16, which means that there is no optical contact with the covered surfaces from the outside.

Finally, a plurality of extraction elements 3, by means of which the light is coupled out from the optical waveguide plate in a known manner, is present on the light emission surface 11.

The light sources are preferably fastened to the bottom wall of a housing in the assembly of the lighting device. Subsequently, the optical waveguide plate 1 with the cavities 20 provided in the correct locations is inserted into the housing, such that each light source 21 lies in a corresponding cavity. Spacers 17 are furthermore provided between the side faces 13 to 16 of the optical waveguide plate and respective inner walls of the housing, as well as between the lower side 12 of the optical waveguide plate and the bottom wall of the housing, by means of which spacers the second reflecting layer 121 (on the inner walls of the housing) is distanced from the optical waveguide plate, so that an air gap remains between the layer 121 on the one hand and the side faces 13 to 16 and the lower side 12 on the other hand.

The light rays issued from the at least one light source 21 can enter the material of the optical waveguide plate 1 only through the side walls 201 of the cavity 20. They distribute themselves in the optical waveguide plate 1 through substantially loss-free total reflections against the side faces 13 to 16 and the lower side 12 of the optical waveguide plate 1, or against the second layer 121 provided thereon, until they are coupled out at the light emission surface 11. This will be described in more detail below.

When a light ray propagating in the optical waveguide plate hits the side wall 201 of a cavity 20, it will enter there, it will be scattered inside the cavity against the light source 21 and/or the highly reflecting first or second layer 204, 121, and will leave the cavity again through the side wall 201.

When a light ray propagating in the optical waveguide plate hits the outer upper side 203 of a cavity, it will either be reflected against the first layer 204 in accordance with the alternatives discussed above, if this layer is in optical contact with the upper side, or it is subjected to a total reflection against the upper side 203 if there is no optical contact with the first layer 204, such that in either case the light ray is conducted past the cavity 20.

This kind of light coupling and light propagation leads to a very homogeneous distribution of the light over the entire optical waveguide plate 1, and in particular to a very homogeneous distribution of the contributions of the individual light sources, i.e. light-emitting diodes, to the light emerging at the light emission surface 11. Since the light of each light source is distributed over the entire optical waveguide plate, moreover, the influence of an individual light source owing to, for example, a fluctuating intensity or a defect, will be small and hardly noticeable.

These properties are improved in proportion as the number of light sources is increased. To obtain as high a number of light sources as possible per unit surface area of the optical waveguide plates, it is particularly suitable to use light-emitting diodes, which are comparatively small and can be inexpensively manufactured. At the same time, a large number of light-emitting diodes obviously leads to a correspondingly high luminous intensity on the light emission surface.

The light can be coupled out from the light emission surface 11 of the plate 1 by means of the extraction elements 3 in a known manner so as to illuminate, for example, a liquid crystal display or an LCD picture screen mounted on the plate. The homogeneity of the illumination can be further improved through a suitable dimensioning and arrangement of the extraction elements, which arrangement may also be irregular.

The optical waveguide plate 1 is preferably arranged in a housing (not shown) with walls which are coated with the second layer 121 and which cover the lower side 12 and the side faces 13 to 16 in accordance with FIG. 2, so that there is no optical contact with the covered surfaces from the outside. The second layer 121 may be specularly or diffusely reflecting.

There is the further possibility of arranging the second layer 121 directly on the relevant side faces 13 to 16 and the lower side 12, in which case the spacers 17 will be absent. This, indeed, has the disadvantage that part of the incident light can be directly reflected from the side faces towards the light emission surface 11, especially in the case in which the second layer is diffusely reflecting, which would have negative effects. These effects may be avoided to a high degree if the second layer is specularly reflecting, but such layers are substantially more expensive because they can only be manufactured with a correspondingly high reflectivity and provided on the surfaces of the optical waveguide plate at a high cost and with much effort.

It was surprisingly found that this problem can be solved in that the second layer 121 is not directly applied to the relevant side faces 13 to 16 and the lower side 12, but at a distance of, for example, 0.1 mm from the optical waveguide plate, such that there is no optical contact between the two because of this air gap. The spacers 17 are provided for this purpose.

Now when a light ray issues from the optical waveguide plate 1 through one of the side faces 13 to 16 (or the lower side 12), it is first diffracted at the side face, then traverses the air gap, and is reflected back by the, preferably diffusely, reflecting second layer 121. After traversing the air gap once more, it enters the optical waveguide plate 1 again and again complies with the conditions for total reflection, provided the refractive index of the plate is not below 1.41.

As a result of this, those light components which leave the optical waveguide plate through the side faces or the lower side are reflected back into the plate gain. White foils or white paints, which are commercially available with reflectivity values of more than 95 up to 98%, may be used for making the second layer 121. It is obviously also possible to use a mirroring second layer 121. A diffusely reflecting layer, however, has the advantage that the light after reflection is even better distributed over the optical waveguide plate and that this layer can be manufactured with a higher reflectivity and at a lower cost than a mirroring layer.

A very effective coupling of the light into the plate is thus possible with this configuration, as well as a substantially loss-free distribution of the light from a large number of light sources.

It was furthermore found to be advantageous to continue the highly reflecting first layer 204 at the upper side 203 of the cavities 20 either with a first portion 204*a* (shown with broken lines in FIG. 2) in horizontal direction into the optical waveguide plate 1 (the optical waveguide plate would have to be manufactured from two layers for this purpose). Alternatively (in particular if the layer is realized by vapor deposition), the layer may be continued with a second portion 204*b* (shown in broken lines in FIG. 2) in a direction perpendicular thereto, around the upper inner sides of the cavity and over a few millimeters along the side walls in downward direction. It is avoided in either case by means of these portions that undesirable scattered light is generated at the edges of the cavity.

For this purpose, furthermore, the regions of the side walls 201 or the lower side 12 of the optical waveguide plate 1 adjoining the opposite, lower edges of the cavities 20 may be provided with a highly reflecting third layer 205, which extends a few millimeters along said regions in each case.

The properties of the lighting device according to the invention as described above may be utilized to particular advantage if the light from light sources of different colors, in particular light-emitting diodes, is mixed in the optical waveguide plate and is to be made available as a mixed color at the light emission surface. To achieve a homogeneous and even color of the mixed light, the light sources are preferably arranged such that mutually adjoining light sources always generate light of different colors.

It would also be possible in principle to use linear light sources instead of the substantially point-shaped light sources described, which linear light sources are present in channels which replace the cylindrical cavities and which are, for example, provided in the optical waveguide plate so as to run in parallel, or which provided on the lower side of the optical waveguide plate.

It should finally be noted that the distance between the reflecting second layer 121 and the side faces or the lower side of the optical waveguide plate is independent of the nature, number, and arrangement of the light sources. The distance may be provided, for example, also if the light sources are not arranged in the optical waveguide plate but along one or several of the side faces thereof. In this case, too, the advantages described above with reference to a substantially loss-free reflection complying with the conditions for total reflection of the light issuing through the remaining side faces can be achieved by means of such a reflecting, gapped layer at the relevant remaining side faces.

What is claimed is:

1. A lighting device, comprising:
a light emission surface;
a plurality of substantially point-shaped light sources; and
an optical waveguide plate into which a plurality of cavities is provided, each cavity accommodating a light source and including an upper side closest to the light emission surface and side walls that allow coupling of light therethrough into the optical waveguide plate, said upper side being covered with a first reflecting layer, said cavities extending substantially less than the entire distance through the optical waveguide plate toward the light emission surface, such that a portion of the light coupled from one of the cavities through the side walls can reach and be emitted from an area of the light emission surface directly above said one of the cavities.

2. The lighting device of claim 1, wherein the side walls of the cavities are substantially perpendicular to the light emission surface, and the upper sides of the cavities are substantially parallel to the light emission surface.

3. The lighting device of claim 1, wherein the cavities are each covered with a second reflecting layer on their lower side opposite to their upper side.

4. The lighting device of claim 1, wherein the cavities are substantially cylindrical in shape.

5. The lighting device of claim 1, wherein the cavities are provided in the lower side of the optical waveguide plate.

6. The lighting device of claim 1, wherein the light sources are light-emitting diodes.

7. A lighting device, comprising:
a light emission surface;
a plurality of substantially point-shaped light sources; and
an optical waveguide plate into which a plurality of cavities is provided, each cavity accommodating a light source and including an upper side closest to the light emission surface and side walls that allow coupling of light therethrough into the optical waveguide plate, said upper side being covered with a first reflecting layer,
wherein the cavities are each covered with a second reflecting layer on their lower side opposite to their upper side, and the second reflecting layer extends over the side faces and the lower side of the optical waveguide plate.

8. A lighting device, comprising:
a light emission surface;
a plurality of first reflecting layers;
a second reflecting layer;
a plurality of substantially point-shaped light sources; and
an optical waveguide plate having at least two side faces, and also having, between the at least two side faces, an underside into which a plurality of cavities is provided, each cavity accommodating a respective one of the light sources, which cavities each comprise an upper side and side walls, the upper side of each cavity facing the light emission surface, said upper side being covered with a respective one of the first reflecting layers, while the coupling of the light into the optical waveguide plate takes place through the side walls, wherein:
the cavities are each covered by the second reflecting layer on their lower side opposite to their upper side;
the second reflecting layer extends over the side faces and the underside of the optical waveguide plate; and
the second reflecting layer is at a distance from the optical waveguide plate, which distance constitutes an air gap.

9. A lighting device, comprising:
a light emission surface;
a plurality of substantially point-shaped light sources; and
an optical waveguide plate into which a plurality of cavities is provided, each cavity accommodating a light source, which cavities each comprise an upper side facing the light emission surface and side walls, said upper side being covered with a first reflecting layer, while the coupling of the light into the optical waveguide plate takes place through the side walls,
wherein the first reflecting layer extends further in horizontal direction with a first portion into the optical waveguide plate.

10. A lighting device, comprising:

a light emission surface;

a plurality of substantially point-shaped light sources; and an optical waveguide plate into which a plurality of cavities is provided, each cavity accommodating a light source, which cavities each comprise an upper side facing the light emission surface and side walls, said upper side being covered with a first reflecting layer, while the coupling of the light into the optical waveguide plate takes place through the side walls, wherein the first reflecting layer extends further with a second portion along the side walls of the cavity.

11. The lighting device of claim 10, wherein the edges of the cavities situated opposite the upper side are surrounded by another reflecting layer.

12. A liquid crystal display device incorporating the lighting device of claim 10.

13. A lighting device, comprising:

a light emission surface;

first and second reflecting layers;

an optical waveguide plate including side faces and an underside therebetween into which at least one cavity is provided that extends substantially less than the entire distance through the optical waveguide plate toward the light emission surface, the cavity including an upper side closest to the light emission surface, a lower side opposite the upper side, and at least one side wall allowing coupling of light into the optical waveguide plate; and at least one light source accommodated within the cavity, the upper side being substantially covered by the first reflecting layer and the lower side being substantially covered by the second reflecting layer.

14. The lighting device of claim 13, wherein the light source is a light-emitting diode.

15. The lighting device of claim 13, wherein the second reflecting layer extends over the underside and the side faces of the optical waveguide plate.

16. A lighting device, comprising:

a light emission surface;

first and second reflecting layers;

an optical waveguide plate including side faces and an underside therebetween into which at least one cavity is provided, the cavity including an upper side closest to the light emission surface, a lower side opposite the upper side, and at least one side wall allowing coupling of light into the optical waveguide plate; and at least one light source accommodated within the cavity, the upper side being substantially covered by the first reflecting layer and the lower side being substantially covered by the second reflecting layer, wherein the light source is a light-emitting diode, the second reflecting layer extends over the underside and the side faces of the optical waveguide plate, and the second reflecting layer is at a distance from the optical waveguide plate, which distance constitutes an air gap.

17. A lighting device comprising:

a light emission surface;

first and second reflecting layers;

an optical waveguide plate including side faces and an underside therebetween into which at least one cavity is provided, the cavity including an upper side closest to the light emission surface, a lower side opposite the upper side, and at least one side wall allowing coupling of light into the optical waveguide plate; and at least one light source accommodated within the cavity, the upper side being substantially covered by the first reflecting layer and the lower side being substantially covered by the second reflecting layer, wherein the first reflecting layer extends beyond the cavity into the optical waveguide plate.

18. A lighting device comprising;

a light emission surface;

first and second reflecting layers;

an optical waveguide plate including side faces and an underside therebetween into which at least one cavity is provided, the cavity including an upper side closest to the light emission surface, a lower side opposite the upper side, and at least one side wall allowing coupling of light into the optical waveguide plate; and at least one light source accommodated within the cavity, the upper side being substantially covered by the first reflecting layer and the lower side being substantially covered by the second reflecting layer, wherein the first reflecting layer extends along the side wall of the cavity.

19. A lighting device, comprising:

a light emmission surface;

first and second reflecting layers;

an optical waveguide plate including side faces and an underside therebetween into which at least one cavity is provided, the cavity including an upper side closest to the light emission surface, a lower side opposite the upper side, and at least one side wall allowing coupling of light into the optical waveguide plate; and at least one light source accommodated within the cavity, the upper side being substantially covered by the first reflecting layer and the lower side being substantially covered by the second reflecting layer, wherein an edge of the cavity situated opposite the upper side is surrounded by a third reflecting layer.

20. The lighting device of claim 13, wherein the side wall of the cavity is substantially perpendicular to the light emission surface, and the upper side of the cavity is substantially parallel to the light emission surface.

21. A display device incorporating the lighting device of claim 13.

* * * * *